US008707042B2

(12) United States Patent
Schneider

(10) Patent No.: US 8,707,042 B2
(45) Date of Patent: Apr. 22, 2014

(54) SHARING KEYS BETWEEN COOPERATING PARTIES

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 460 days.

(21) Appl. No.: 12/200,730

(22) Filed: Aug. 28, 2008

(65) Prior Publication Data

US 2010/0058059 A1 Mar. 4, 2010

(51) Int. Cl.
*H04L 29/06* (2006.01)

(52) U.S. Cl.
USPC .............................. 713/171; 380/259; 380/44

(58) Field of Classification Search
USPC ................. 380/259, 44, 45; 713/171
See application file for complete search history.

(56) References Cited

U.S. PATENT DOCUMENTS

| | | | |
|---|---|---|---|
| 4,200,770 A | 4/1980 | Hellman et al. | |
| 4,797,921 A * | 1/1989 | Shiraishi | 380/28 |
| 5,251,258 A * | 10/1993 | Tanaka | 380/282 |
| 5,613,005 A * | 3/1997 | Murakami et al. | 380/28 |
| 5,771,244 A * | 6/1998 | Reed et al. | 714/752 |
| 5,987,131 A * | 11/1999 | Clapp | 713/171 |
| 6,181,729 B1 * | 1/2001 | O'Farrell | 375/130 |
| 6,665,405 B1 * | 12/2003 | Lenstra | 380/28 |
| 6,961,427 B1 * | 11/2005 | Qiu et al. | 380/44 |
| 7,069,287 B2 * | 6/2006 | Paar et al. | 708/492 |
| 7,142,668 B1 * | 11/2006 | Kogure | 380/28 |
| 7,296,212 B1 * | 11/2007 | Hammons, Jr. | 714/781 |
| 7,346,159 B2 * | 3/2008 | Gura et al. | 380/28 |
| 7,508,936 B2 * | 3/2009 | Eberle et al. | 380/30 |
| 7,715,556 B2 * | 5/2010 | Chang et al. | 380/44 |
| 7,738,657 B2 * | 6/2010 | Gopal et al. | 380/28 |
| 7,760,875 B2 * | 7/2010 | Gueron et al. | 380/44 |
| 7,987,367 B2 * | 7/2011 | Yao et al. | 713/171 |
| 8,144,864 B2 * | 3/2012 | Gueron et al. | 380/28 |
| 8,271,570 B2 * | 9/2012 | Gopal et al. | 708/492 |
| 8,380,767 B2 * | 2/2013 | Ozturk et al. | 708/204 |
| 8,380,777 B2 * | 2/2013 | Ozturk et al. | 708/492 |
| 8,588,409 B2 * | 11/2013 | Brown et al. | 380/30 |
| 2004/0158597 A1 * | 8/2004 | Ye et al. | 708/492 |
| 2005/0213758 A1 * | 9/2005 | Lenstra et al. | 380/44 |
| 2006/0036861 A1 * | 2/2006 | Chernyak et al. | 713/171 |
| 2008/0056490 A1 * | 3/2008 | Akishita et al. | 380/44 |
| 2008/0069344 A1 * | 3/2008 | Yao et al. | 380/44 |

(Continued)

OTHER PUBLICATIONS

Peterson, W. Wesley; "Peterson's Table of Irreducible Polynomials Over GF(2)", Taken from "Error-Correcting Codes", MIT Press, 1970, 5 pgs.*

(Continued)

*Primary Examiner* — Victor Lesniewski
(74) *Attorney, Agent, or Firm* — Lowenstein Sandler LLP

(57) ABSTRACT

An apparatus and a method for generating a secure cipher key over an insecure channel. In one embodiment, a set of polynomials is generated and shared between a first party and a second party over the insecure channel. The first party generates a first random exponent for its private cipher key. The second party generates a second random exponent for its private cipher key. The first party operates on the set of polynomials with the first random exponent and sends the results to the second party. The second party operates on the set of polynomials with the second random exponent and sends the results to the first party. A shared cipher key is computed based on the exchanged operation results.

12 Claims, 4 Drawing Sheets

(56) References Cited

U.S. PATENT DOCUMENTS

2009/0006512 A1* 1/2009 Ozturk et al. ............... 708/205
2009/0052657 A1* 2/2009 Golic ............................ 380/28
2010/0020965 A1* 1/2010 Gueron et al. ............... 380/44

OTHER PUBLICATIONS

Gueron, Shay; Kounavis, Michael; "A Technique for Accelerating Characteristic 2 Elliptic Curve Cryptography", Fifth International Conference on Information Technology: New Generations, Apr. 7-9, 2008, pp. 265-272.*

Bhattacharya, P.; Debbabi, M.; Otrok, H.; "Improving the Diffie-Hellman Secure Key Exchange", International Conference on Wireless Networks, Communications and Mobile Computing, Jun. 13-16, 2005, vol. 1, pp. 193-197.*

Wikipedia, the free encyclopedia, Diffie-Hellman Key Exchange, 5 pages, http://en.wikipedia.org/wiki/Diffie-Hellman_key_exchange, Aug. 12, 2008, modified May 7, 2011, as downloaded May 20, 2011.

* cited by examiner

SHARING KEYS BETWEEN COOPERATING PARTIES

TECHNICAL FIELD

Embodiments of the present invention relate to computing systems, and more particularly, to authentication over an insecure channel.

BACKGROUND

Cryptographic systems are widely used to ensure the privacy and authenticity of messages communicated over insecure channels. A privacy system prevents the extraction of information by unauthorized parties from messages transmitted over an insecure channel, thus assuring the sender of a message that it is being read only by the intended receiver. An authentication system prevents the unauthorized injection of messages into an insecure channel, assuring the receiver of the message of the legitimacy of its sender.

One of the principal difficulties with existing cryptographic systems is the need for the sender and receiver to exchange a cipher key over a secure channel to which the unauthorized party does not have access. The exchange of a cipher key frequently is done by sending the key in advance over a secure channel such as private courier or registered mail; such secure channels are usually slow and expensive.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for generating a secure cipher key over an insecure channel. In one embodiment, a set of polynomials is generated and shared between a first party and a second party over the insecure channel. The first party generates a first random exponent for its private cipher key. The second party generates a second random exponent for its private cipher key. The first party operates on the set of polynomials with the first random exponent and sends the results to the second party. The second party operates on the set of polynomials with the second random exponent and sends the results to the first party. A shared cipher key is computed based on the exchanged operation results.

Figure 1:
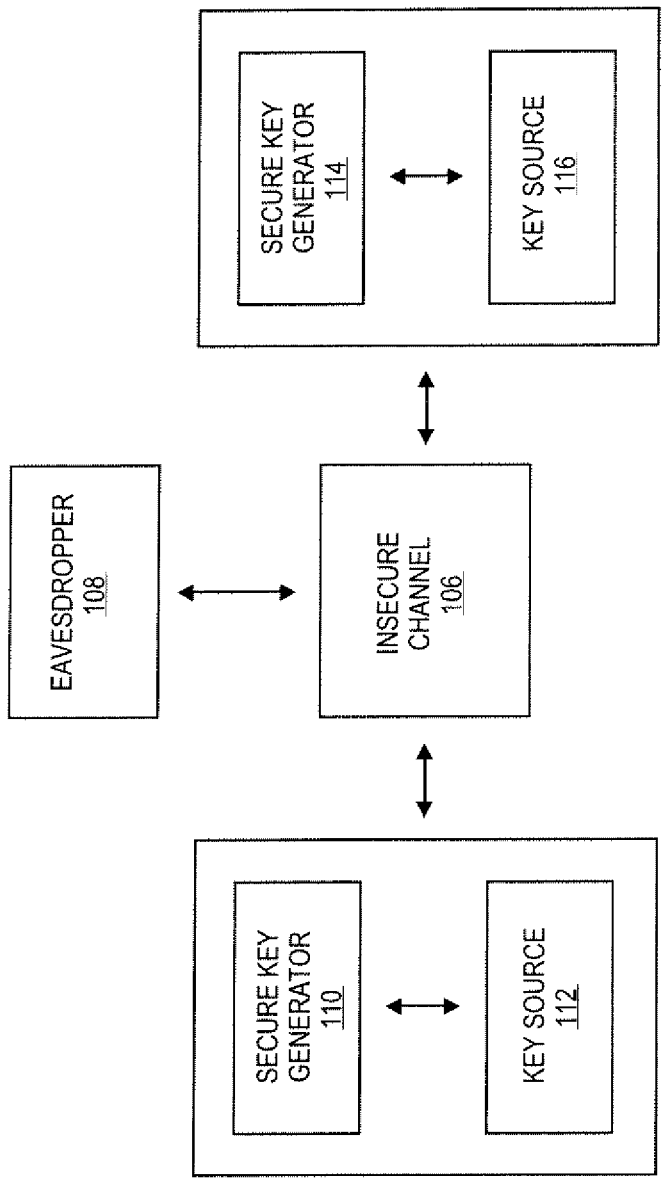
FIG. 1 is a block diagram illustrating one embodiment of a cryptographic system.

FIG. 1 is a block diagram illustrating one embodiment of a cryptographic system in which all communications take place over an insecure communication channel 106, for example, a telephone line, or a computer network such as the Internet. A first device 102 communicates with a second device 104 over the insecure communication channel 106. In one embodiment, the first device 102 includes a secure cipher key generator 110 and a cipher key source module 112. The second device 104 includes a secure cipher key generator 114 and a cipher key source module 116.

The cipher key source modules 112, 116 respectively generate a random number and a private cipher key based on the generated random number. In one embodiment, the random number includes a random integer exponent. For example, cipher key source module 112 picks the number 13 as a random exponent, and cipher key source module 116 picks the number 11 as a random exponent. These numbers are kept private and not shared with each other.

Secure cipher key generators 110, 114 respectively operate on the generated random number using a shared set of polynomials among the parties. In one embodiment, polynomials over a field GF(q) modulo an irreducible polynomial f of degree n is used. This scheme would generate a key roughly the same size as the original Diffie-Hellman key exchange, with a prime about the same size as $q^n$.

In one embodiment, q is a prime of a convenient size (e.g., 257 or 65537). The advantage of using this is that plain old single or double precision integer arithmetic can be used. The disadvantage is the resulting bits may be slightly biased towards zero. This bias is more severe the farther away from a power of two for the prime being used. In another embodiment, q is a power of a prime.

In another embodiment, q is a power of 2 of a convenient size (e.g., 256 or 65536). The advantage of using this is unbiased results. The disadvantage is that the computation may be slower and more complicated in software.

In one embodiment, the shared set of polynomials may include a primitive polynomial f, and a generator polynomial g. Cipher key source modules 112, 116 respectively generate random exponent power a and b. Secure cipher key generator 110 of the first device 102 operates on the shared set of polynomials by raising the generator g to the random exponent power a mod f. The computation results are sent to the second device 104. Similarly, secure cipher key generator 114 of the second device 104 operates on the shared set of polynomials by raising the generator g to the random exponent power b mod f. The computation results are sent to the first device 102.

Secure cipher key generator 10 of the first device 102 computes a shared cipher secret key based on the received computation results of secure cipher key generator 114. In particular, secure cipher key generator 110 operates on the received computation results from the second device 104 by raising the received computation results to the random exponent power a mod f. Similarly, secure cipher key generator 114 of the second device 104 computes the shared cipher secret key based on the received computation results of secure cipher key generator 110. In particular, secure cipher key generator 114 operates on the received computation results from the first device 102 by raising the received computation results to the random exponent power b mod f. Both operations by the respective secure cipher key should be the same.

An eavesdropper 108 connected to the insecure channel 106 would only know of the shared set of polynomials q, f, and g. The respective random exponents a and b selected by cipher key sources 112 and 116 are kept private and not shared with each other. Thus the eavesdropper 108 does not know the respective private cipher keys of first device 102 and second device 104.

Figure 2:
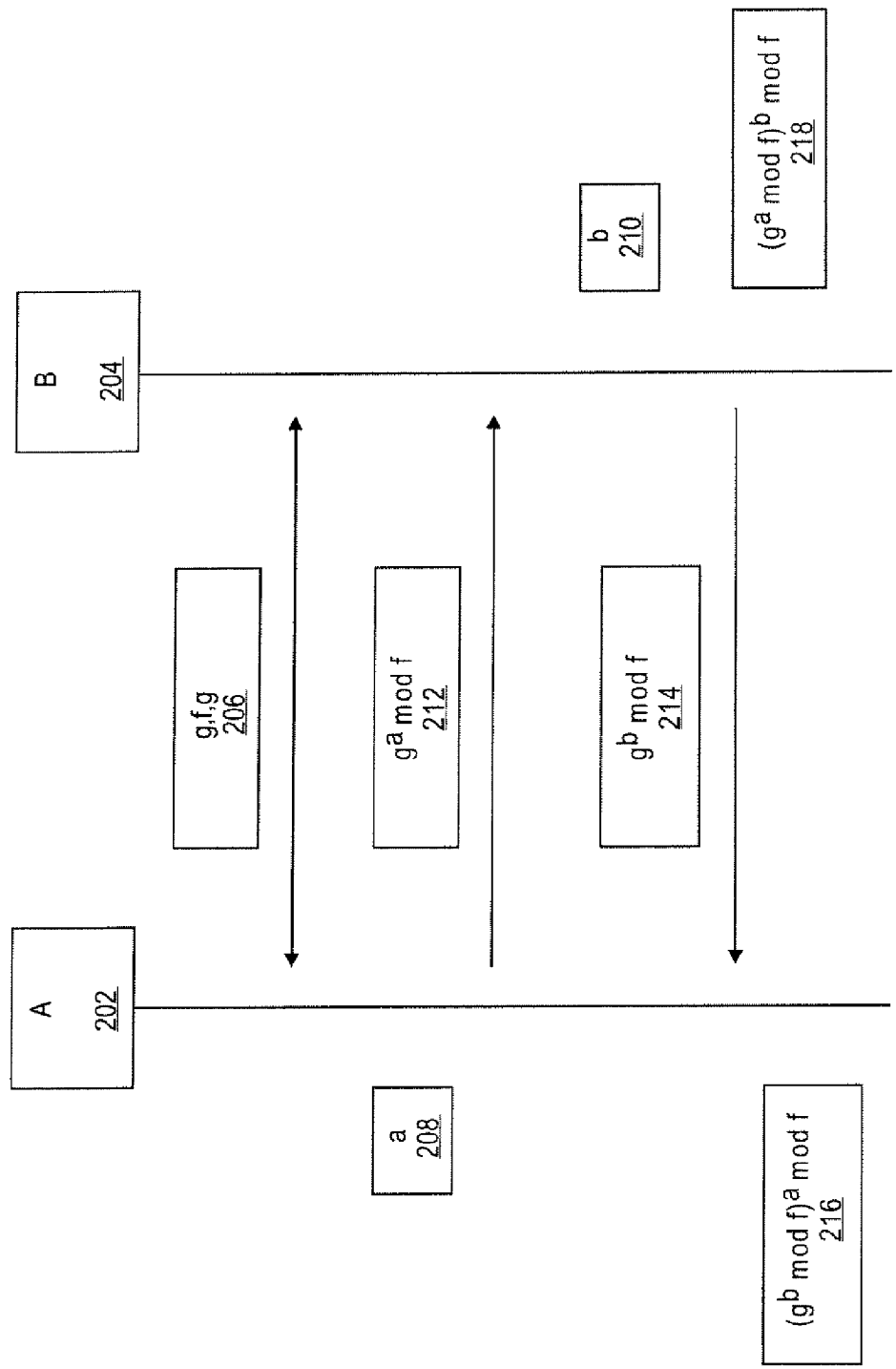
FIG. 2 is a ladder diagram illustrating one embodiment of a process for generating a cryptographic message over an unsecured channel.

FIG. 2 is a ladder diagram illustrating one embodiment of a process for generating a cryptographic message over an unsecured channel. A first party A 202 communicates with a second party B 204 over an insecure channel. A set of polynomials is generated and shared between A and B. In one embodiment, the set of polynomials 206 includes q, f, and g. q is a prime number or a number that is a power of a prime. f is a primitive polynomial of degree n over q, and g is a polynomial of lesser degree than f over q that is a primitive element of $GF(q'')$. For example, $q=17$, $f=x^3+x+3$, and $g=x^2x+1$. In an alternative embodiment, f is an irreducible polynomial that may not be primitive. In an alternative embodiment, g is a polynomial other than a primitive element of $GF(q'')$.

Party A 202 selects a random exponent a 208 and keeps it private. For example, a=13. Similarly, party B 204 selects a random exponent b 210 and keeps it private. For example, b=11.

Party A 202 operates on the set of polynomials 206 with the selected random exponent a 208 and sends the computation results to party B 204. Using the same example, party A 202 computes $(x^2+x+1)^{13}$ mod $x^3+x+3$ resulting in $15x^2+9x+7$.

Party B 204 operates on the set of polynomials 206 with the selected random exponent b 210 and sends the computation results to party A 202. Using the same example, party B 204 computes $(x^2+x+1)^{11}$ mod $x^3+x+3$ resulting in $14x^2+3x+10$.

The parties exchange their calculated polynomials, and each raise the received polynomial to their original exponents. For example, party A 202 calculates $(14x^2+3x+10)^{13}$ mod $x^3+x+3$ resulting in $2x^2+x+15$. Party B 204 calculates $(15x^2+9x+7)^{11}$ mod $x^3+x+3$ resulting also in $2x^2+x+15$.

Figure 3:
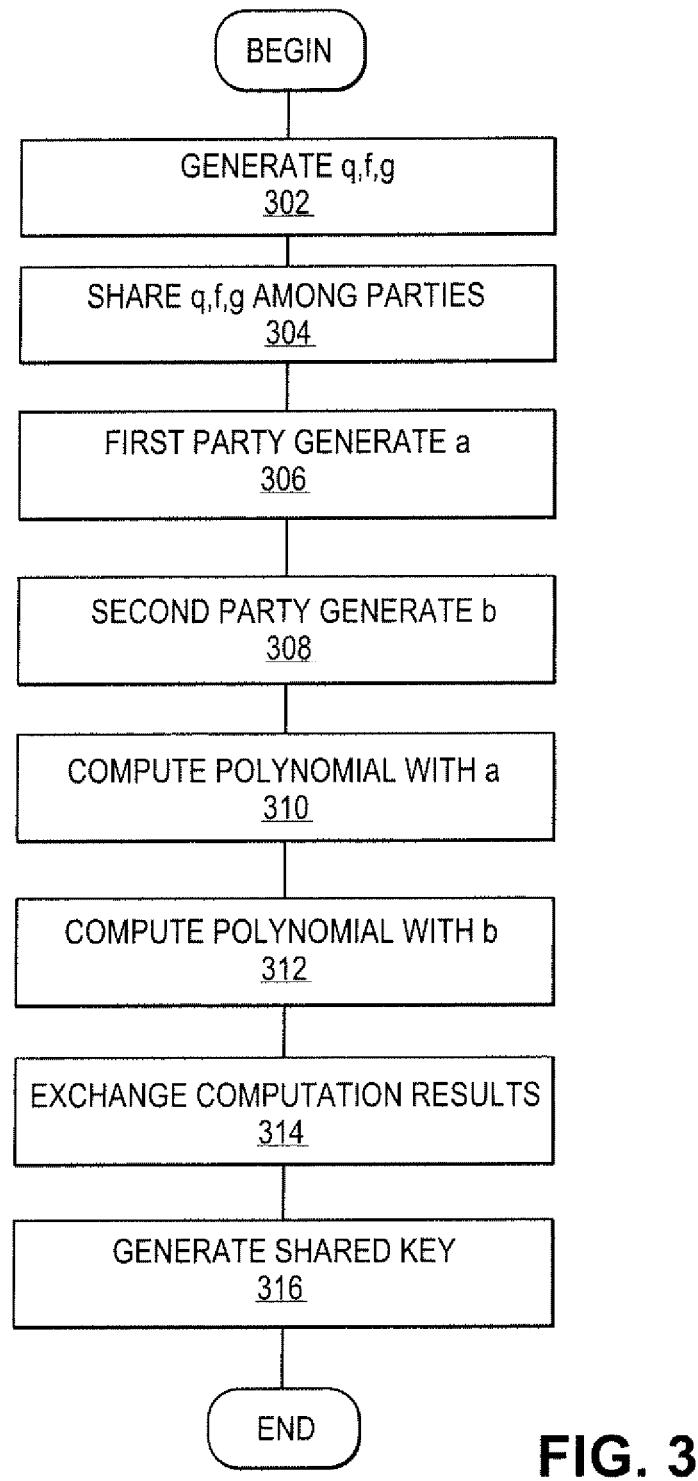
FIG. 3 is a flow diagram illustrating a method for communication over an unsecured channel.

FIG. 3 is a flow diagram illustrating a method for communication over an unsecured channel. At 302, a set of polynomials is generated. In one embodiment, the set of polynomials may include an irreducible polynomial f, and a generator polynomial g.

At 304, the set of polynomials is shared with a first party and a second party.

At 306, the first party selects a random exponent a to generate a private cipher key. At 308, the second party selects a random exponent b to generate a private cipher key.

At 310, the first party operates the set of shared polynomials with the random exponent a. In one embodiment, the first party operates on the shared set of polynomials by raising the generator g to the random exponent power a mod f.

At 312, the second party operates the set of shared polynomials with b. In one embodiment, the second party operates on the shared set of polynomials by raising the generator g to the random exponent power b mod f.

At 314, the computation results of the first and second party are exchanged.

At 316, a shared cipher key is generated at each party by operating on the computation results. In one embodiment, the first party operates on the received computation from the second party by raising that computation result to the random exponent power a mod f. The second party operates on the received computation from the first party by raising that computation result to the random exponent power b mod f. Both should computation results from the first party and the second party should be the same. This result can be used to generate a shared cipher key between the first party and the second party.

Figure 4:
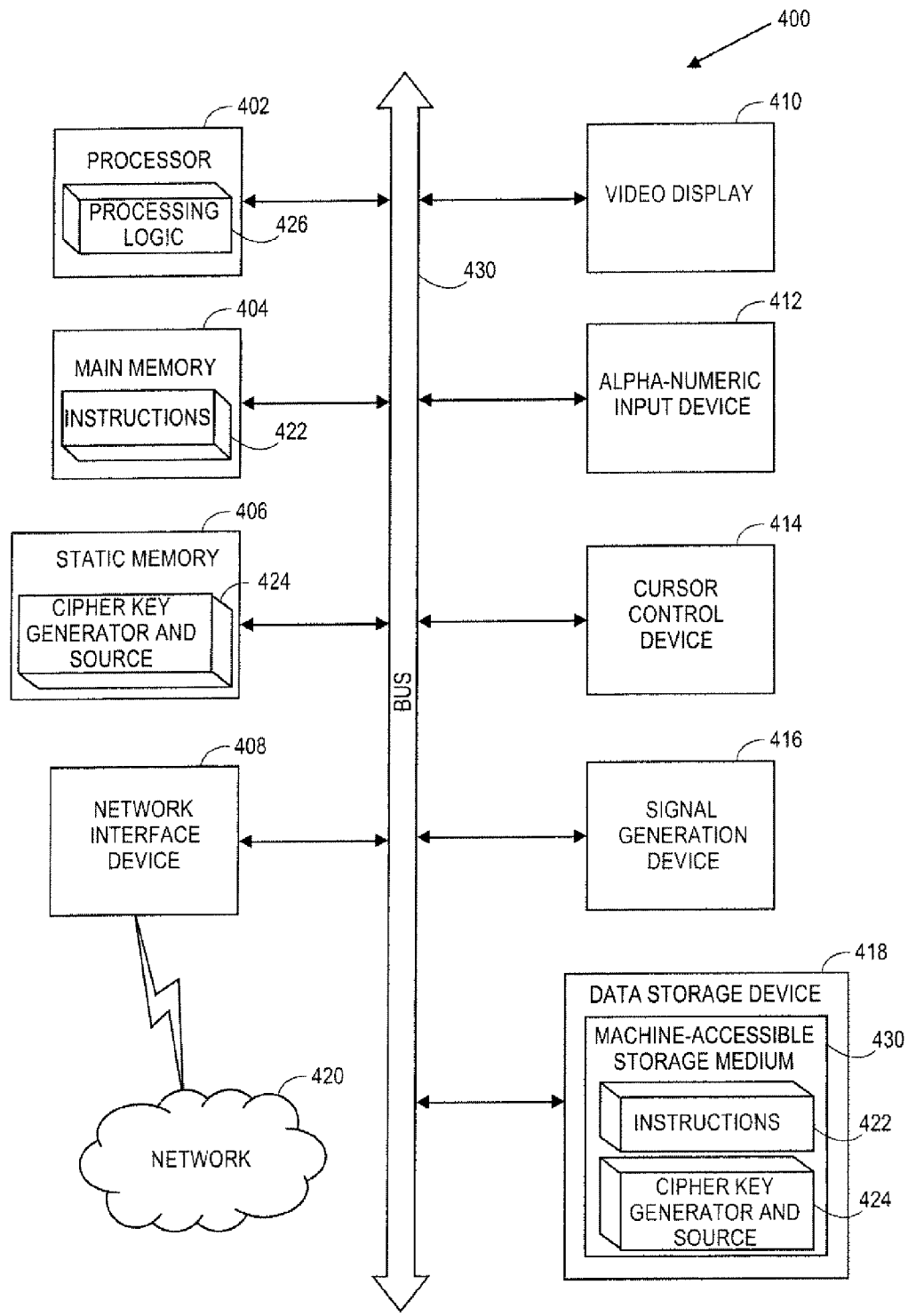
FIG. 4 is a block diagram illustrating an example of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

The machine-accessible storage medium 430 may also be used to store the secure cipher key generator and cipher key source 424 as presently described. The secure cipher key generator and cipher key source 424 may also be stored in other sections of computer system 400, such as static memory 406.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

sharing a set of polynomials by a first computing system with a second computing system over an insecure communication channel, wherein the set of polynomials comprises 1) a prime integer that defines a size of a finite field, wherein the prime integer has a value that is one greater than two raised to a power of at least eight, 2) an irreducible polynomial that is not a primitive polynomial and 3) a generator polynomial, the generator polynomial comprising a polynomial degree less than a polynomial degree of the irreducible polynomial, the set of polynomials being over the finite field, wherein the finite field comprises a number of elements based on the prime integer that is compatible with double precision integer arithmetic;

operating on the set of polynomials to create a first resultant polynomial, by the first computing system, by raising the generator polynomial to a power of a first random exponent, modulo the irreducible polynomial that is not a primitive polynomial, and sending the first resultant polynomial to the second computing system;

receiving a second resultant polynomial from the second computing system, the second computing system having operated on the set of polynomials to create the second resultant polynomial by raising the generator polynomial to a power of a second random exponent, modulo the irreducible polynomial;

computing a first shared cipher key, by the first computing system, by raising the second resultant polynomial to the power of the first random exponent, modulo the irreducible polynomial, wherein the second computing system is to compute a second shared cipher key by raising the first resultant polynomial to the power of the second random exponent, modulo the irreducible polynomial, wherein the second shared cipher key is the same as the first shared cipher key.

2. The method of claim 1, wherein the prime integer is a public base.

3. The method of claim 1, wherein the prime integer is 257 or 65537.

4. The method of claim 1, wherein the generator polynomial is other than a primitive element of the finite field.

5. An apparatus comprising:

a memory; and a processing device coupled to the memory;

a key source module executed from the memory by the processing device to generate a first random exponent; and a secure key generator coupled to the key source module, the secure key generator executed from the memory by the processing device to select a set of polynomials comprising 1) a prime integer that defines a size of a finite field, wherein the prime integer has a value that is one greater than two raised to a power of at least eight, 2) an irreducible polynomial that is not a primitive polynomial and 3) a generator polynomial, the generator polynomial comprising a polynomial degree less than a polynomial degree of the irreducible polynomial, the set of polynomials being over the finite field comprising a number of elements based on the prime integer that is compatible with double precision integer arithmetic, raise the generator polynomial to a power of a first random exponent, modulo the irreducible polynomial that is not a primitive polynomial to create a first resultant polynomial, send the first resultant polynomial to a computing system, receive a second resultant polynomial from the computing system, the second resultant polynomial having been generated by the computing system operating on the set of polynomials by raising the generator polynomial to a power of a second random exponent, modulo the irreducible polynomial, and compute a first shared cipher key by raising the second resultant polynomial to the power of the first random exponent, modulo the irreducible polynomial, wherein the first shared cipher key is the same as a second shared cipher key computed by the computing system by raising the first resultant polynomial to the power of the second random exponent, modulo the irreducible polynomial.

6. The apparatus of claim 5, wherein the prime integer comprises a public base.

7. The apparatus of claim 5, wherein the prime integer is of 257 or 65537.

8. The apparatus of claim 5, wherein the generator polynomial is other than a primitive element of the finite field.

9. A non-transitory computer-readable storage medium including instructions that, when executed by a processing device, cause the processing device to perform a set of operations comprising:

sharing a set of polynomials between the processing device and a second processing device over an insecure communication channel, wherein the set of polynomials comprises 1) a prime integer that defines a size of a finite field, wherein the prime integer has a value that is one greater than two raised to a power of at least eight, 2) an irreducible polynomial that is not a primitive polynomial and 3) a generator polynomial, the generator polynomial comprising a polynomial degree less than a polynomial degree of the irreducible polynomial, the set of polynomials being over the finite field comprising a number of elements that is based on the prime integer that is compatible with double precision integer arithmetic;

operating on the set of polynomials to create a first resultant polynomial, by the processing device, by raising the generator polynomial to a power of a first random exponent, modulo the irreducible polynomial that is not a primitive polynomial and sending the first resultant polynomial to the second processing device;

receiving a second resultant polynomial from the second processing device, the second resultant polynomial having been generated by the second processing device operating on the set of polynomials by raising the generator polynomial to a power of a second random exponent, modulo the irreducible polynomial; and computing a first shared cipher key, by the processing device, by raising the second resultant polynomial to the power of the first random exponent, modulo the irreducible polynomial, wherein the first shared cipher key is the same as a second shared cipher key computed by the second processing device by raising the first resultant polynomial to the power of the second random exponent, modulo the irreducible polynomial.

10. The non-transitory computer-readable medium of claim 9, wherein the prime integer comprises a public base.

11. The non-transitory computer-readable medium of claim 9, wherein the prime integer is 257 or 65537.

12. The non-transitory computer-readable medium of claim 9, wherein the generator polynomial is other than a primitive element of the finite field.

* * * * *